(No Model.)

H. W. ARMSTRONG.
TRACK GAGE.

No. 568,725. Patented Oct. 6, 1896.

WITNESSES

INVENTOR
Harry W. Armstrong
by his attorneys
Bakewell & Bakewell

UNITED STATES PATENT OFFICE.

HARRY W. ARMSTRONG, OF OAKMONT, PENNSYLVANIA.

TRACK-GAGE.

SPECIFICATION forming part of Letters Patent No. 568,725, dated October 6, 1896.

Application filed November 21, 1895. Serial No. 569,604. (No model.)

*To all whom it may concern:*

Be it known that I, HARRY W. ARMSTRONG, of Oakmont, in the county of Allegheny and State of Pennsylvania, have invented a new and useful Improvement in Gages, of which the following is a full, clear, and exact description, reference being had to the accompanying drawings, in which—

Figure 1:
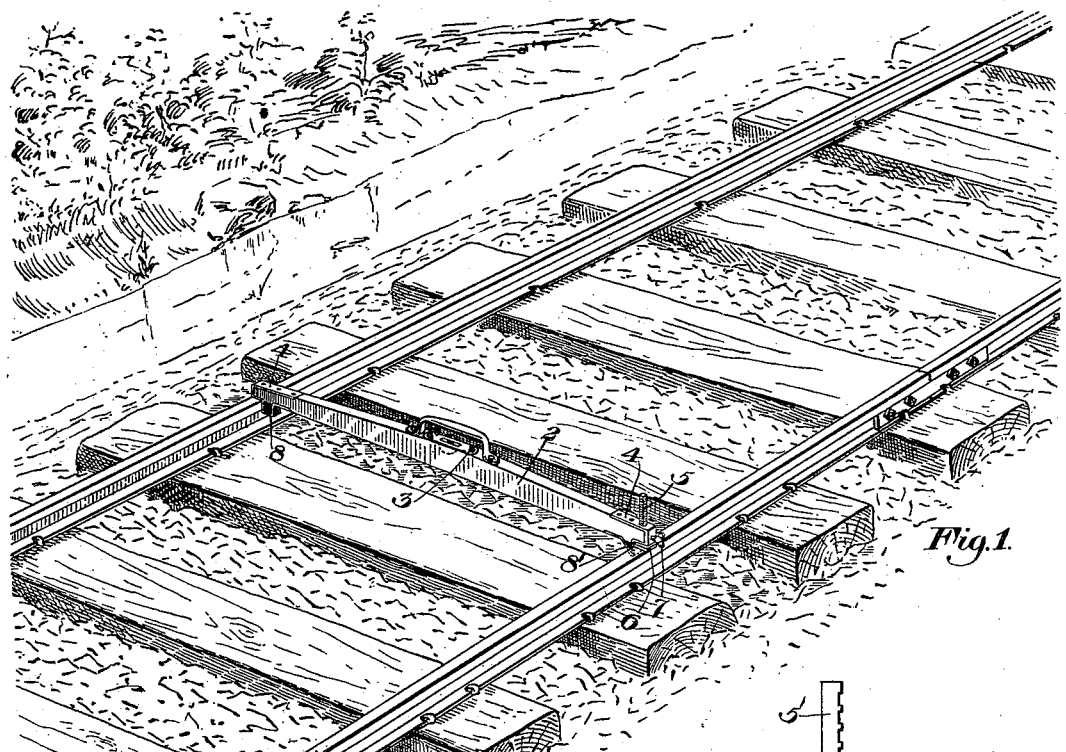
Figure 4:
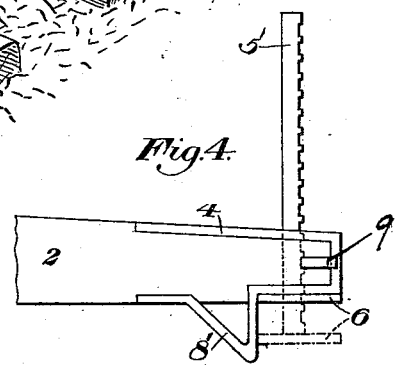
Figure 2:
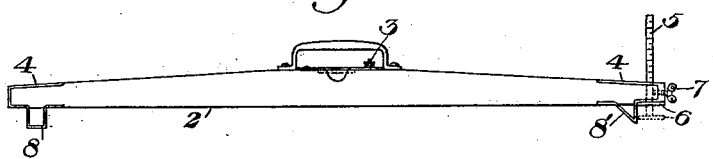
Figure 3:
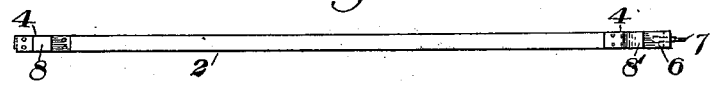

Figure 1 is a perspective view showing a portion of a railway-track with my improved gage and level thereon. Fig. 2 is a side elevation, and Fig. 3 a bottom plan view, of the level and gage; and Fig. 4 is a modification.

My invention relates to the leveling up of the tracks of railways, and also the gaging of the space between the rails, and is designed to provide a simple and effective instrument for this purpose.

In the drawings, 2 represents the level, which consists of a wooden bar having the usual spirit-level secured at the center of its upper face. This spirit-level is provided at one end with an adjusting-screw 3, by which the level may be accurately adjusted and warping of the wooden base or other distortion provided for. Each end of the level is provided with an inclosing band or strip of metal 4, which covers the upper, lower, and end faces of the end portions. At one end a vertical slot or square hole is made through the body of the level and through the inclosing strip, within which hole is guided the vertical gage or measuring bar 5, this bar being provided at its lower end with a horizontal plate 6, which rests upon the top face of the rail, and when in normal closed position this plate is flush with the bottom of the level, the level being recessed slightly for its reception. One or more faces of this bar is provided with graduations, preferably in quarter-inches, and on its outer face I preferably provide small recesses, spaced apart the same distance as the graduations upon the bar, which recesses are engaged by the thumb-screw 7, which has a screw-threaded engagement with a hole in the outer thickened end of the inclosing strip.

To enable the instrument to be used as a gage as well as a level, I form at the ends of the bar 2 vertical lugs adapted to engage the inner sides of the head of the rail, these lugs being formed preferably by bending the lower portions of the inclosing strips downwardly into reflexed loop portions 8 8', the outer faces of which are distant from each other a space equal to the gage of the track. These depending lugs or loops may be of any desired form, but I prefer to provide one of them (the lug 8) in the form of a square or rectangular hollow block, which is of a width corresponding to the proper distance between the inner guard-rail of the track and the rails proper, thus providing a gage for the guard-rails. The plate 6 is separate from the lug 8', and is movable vertically in contact with the outer side thereof. This is important, because as the lug 8' has no vertical movement the device may be used as a track-gage even though the plate 6 be removed, and because it is fixed its accuracy of adjustment is not apt to be impaired. Within the scope of the broader claims the lug 8' may be made otherwise than by looping the metal strip 4.

In the form of Fig. 4 I show the bar 5' as provided with a series of side recesses which are engaged by a wedge 9 driven in a horizontal slot in the level, the outer edge of the wedge bearing upon the inclosing strip, as shown.

It will be noticed that the adjusting-screw 7 and wedge 9 are inserted at the end of the gage and pass through the metal strip by which the end is bound. This is important and is made the subject of specific claim, because the bearing of the wedge or screw being on the metal the construction is stronger and the parts are not apt to be displaced or broken off.

In using the instrument it is laid upon the track transversely, as shown in Fig. 1, with the end having the measuring-bar upon the lower or depressed rail. The thumb-screw then being loosened, the measuring-bar is forced downwardly and the level lifted until it is brought to a horizontal position, when the gage 5 at once shows the amount which the rail has to be lifted to bring it to the proper position, the depending lugs at the same time gaging the distance between the rails.

The advantages of the device will be apparent to those skilled in the art, since a simple, light, and compact device is provided, having means for leveling and gaging the track, and also gaging the guard-rails.

To give a better balance to the device for carrying, I may place the handle slightly toward the gage end of the level to provide for the additional weight of such end.

I claim—

A combined track-gage and level, having at one end a lug or stop adapted to engage the side of the rail for gaging the width of the track, and a separate vertically movable and adjustable level measuring-bar having at its lower end a plate 6 adapted to rest on the surface of the rail and to bear laterally against said lug or stop, which serves as a guide therefor; substantially as described.

In testimony whereof I have hereunto set my hand.

HARRY W. ARMSTRONG.

Witnesses:
  LENDELL A. CONNER, Jr.,
  H. M. CORWIN.